Figures 3, 4:
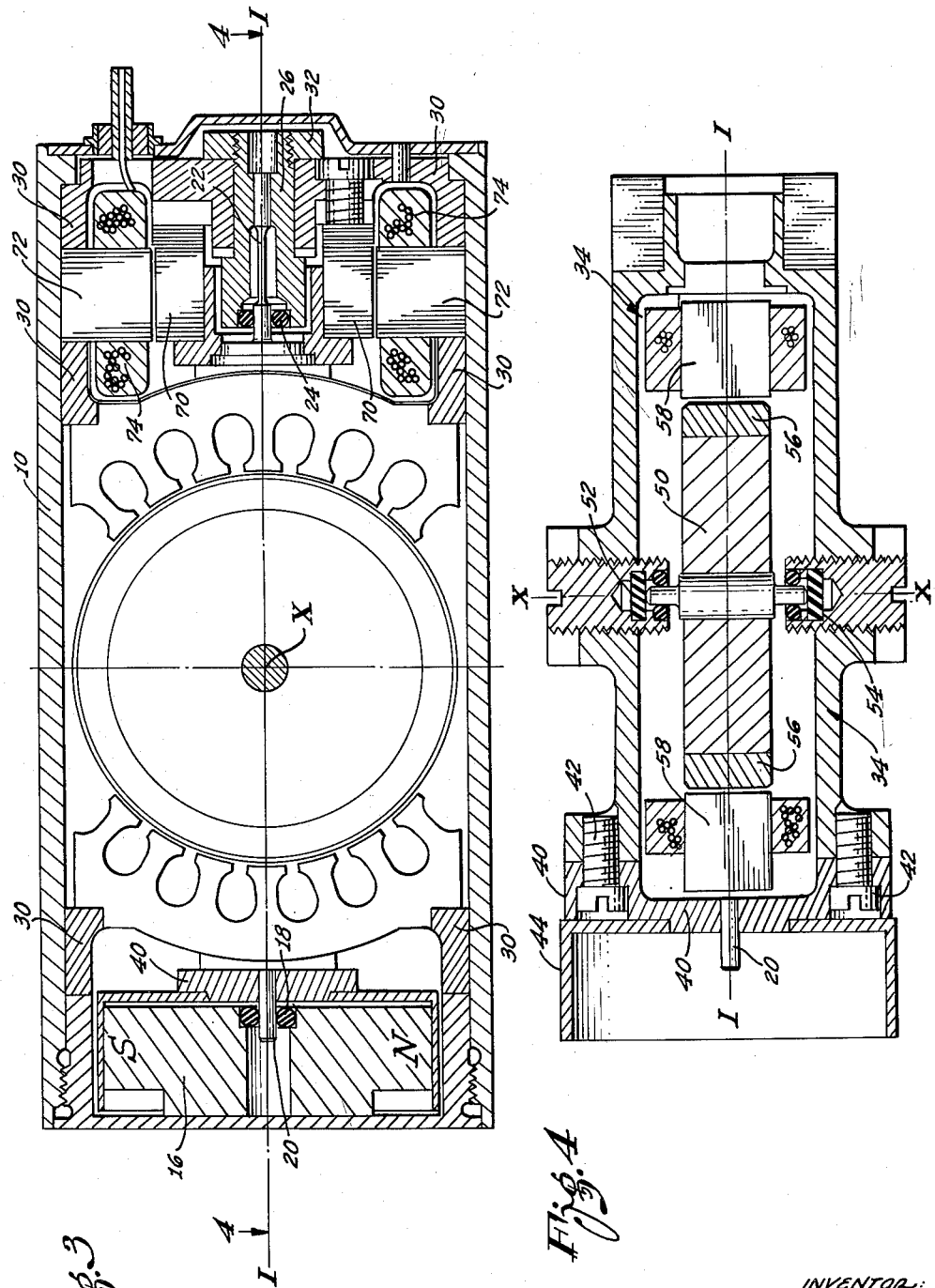

May 2, 1961 — W. E. BENNETT — 2,982,139
RATE GYROSCOPE
Filed Oct. 5, 1959 — 2 Sheets-Sheet 1
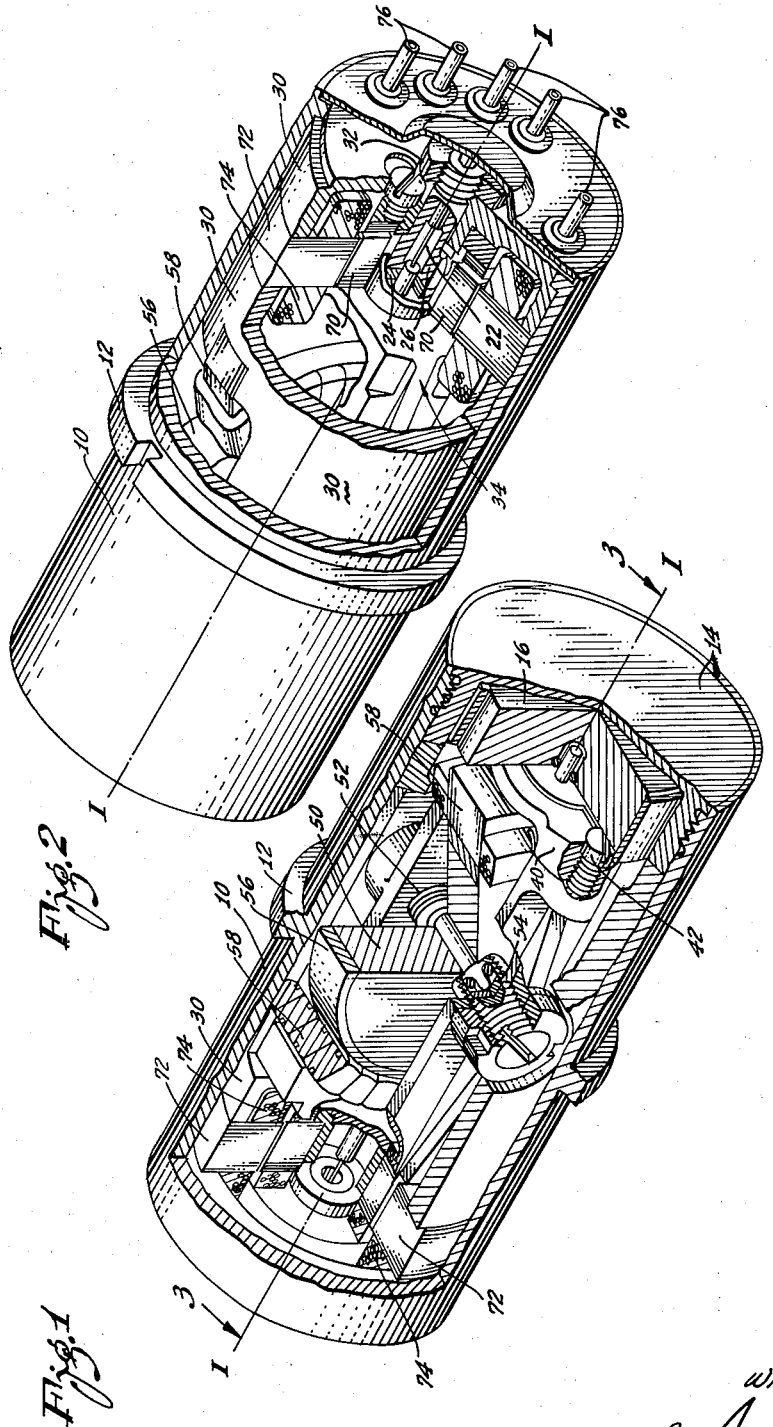
INVENTOR:
William E. Bennett
By Smyth & Roston
Attorneys May 2, 1961  W. E. BENNETT  2,982,139
RATE GYROSCOPE
Filed Oct. 5, 1959  2 Sheets-Sheet 2

INVENTOR:
William E. Bennett
Attorneys

:::

United States Patent Office 2,982,139
Patented May 2, 1961

2,982,139
RATE GYROSCOPE

William E. Bennett, Encino, Calif., assignor to Telecomputing Corporation, Los Angeles, Calif., a corporation of California Filed Oct. 5, 1959, Ser. No. 844,273

3 Claims. (Cl. 74—5.5)

The present invention relates to rate gyroscopes, and it relates more particularly to an improved rate gyroscope of the sub-miniature type and which is capable of high temperature operation.

A rate gyroscope is a single axis instrument, in which an inertial mass spins about that axis, and which is sensitive to angular rate of change about an input axis perpendicular to the axis of the spinning mass. When an input turning rate is applied to the input axis, the gyroscopic action will cause a torque to appear about an output axis which is perpendicular to both the input axis and the axis of the spinning inertial mass.

The torque referred to in the preceding paragraph is directly proportional to the product of the input turning rate and the angular momentum of the inertial mass. In response to the torque, the gyroscopic gimbal element supporting the inertial mass is caused to accelerate about the output axis. This gimbal is constrained by a spring, and it is caused to precess to an angle at which the restraining torque is exactly equal to the precession torque.

The angular displacement of the gyroscopic element, or gimbal, persists as long as the input turning rate persists. This angular displacement is a direct measurement of the input turning rate about the input axis. A signal-producing device is controlled by the gimbal to develop an output voltage which is proportional to the input turning rate. When the input turning rate ceases, the spring action returns the gimbal to its original position, and the signal-producing device produces a zero or null output voltage.

The present invention, as mentioned above, provides an improved single axis rate gyroscope assembly. The embodiment of the invention to be described may be constructed to be of sub-miniature size of, for example, approximately 1½ inches long and ¾ inch in diameter. Moreover, the unit may be constructed to withstand extreme temperatures up to, for example, 700° F. The high temperature capabilities of the gyroscope to be described are possible because it does not use a floatation dashpot damping. Also, the miniaturization of the unit of the invention is made practical due to a unique and improved construction of the electric motor which drives the inertial mass of the gyroscope.

Floatation dashpot damping is not suitable for use in instruments which are to operate in a wide temperature range. This is because the more common floatation damping fluids which might perform satisfactorily at high temperatures are in their solid state at room temperatures. Moreover, the usual requirements of low starting times in gyroscopes of the type under consideration obviates the possible use of heaters of any practicable size.

The rate gyroscope of the embodiment of the present invention to be described is constructed to utilize magnetic drag-cup damping. This permits the gyroscope of the invention to be used in a wide range of temperatures because the difficulties encountered by the use of damping fluids do not arise.

The embodiment of the invention to be described may conveniently be constructed to use jewel bearing supports for both the inertial mass rotor and the gimbal. The gyroscope of the embodiment of the invention to be described also uses an electric drive motor whose stator is supported on the frame of the gyroscope rather than on the gimbal for reasons to be explained.

One of the reasons is that the positioning of the stator on the frame permits the weight of the gimbal and the rotor of the gyroscope of the invention to be maintained at a relatively low value. This permits the relatively delicate jewel-type bearings to be used to advantage. Because of the low weight of the gimbal-supported elements in the gyroscope of the invention, the shock and vibration loads on the jewel bearings can be maintained well within present-day safe stress limits. Moreover, the jewels can function in their inherent low friction region.

As noted above, in the embodiment of the invention to be described, the rotor of the gyroscope is driven by a stator which is fixed to the frame of the gyroscope, rather than to the gimbal as is the practice in most prior art units. This reduces the inertia of the gimbal as compared with the prior art assemblies. The reduction in gimbal inertia provides a unit with a high natural frequency resulting in more desirable response characteristics.

The construction referred to in the preceding paragraph permits a greater percentage of the over-all gyroscope mass to be used for motor iron and copper, as compared with usual present-day designs. This allows for greater flexibility in the design of a quick-starting and efficient motor for driving the gyroscope.

This increased amount of iron that may be incorporated in the gyroscope of the present invention without affecting the characteristics of the gyroscope, enables the gyroscope to operate effectively at extremely high temperatures at which the permeability of the iron is greatly reduced. Moreover, the increased amount of iron that may be used in the gyroscope of the invention permits less efficient, but more thermally stable materials to be used in the assembly of the invention.

Another important advantage of the gyroscope to be described, and which in accordance with one embodiment of the invention, has the stator of its drive motor mounted on the frame of the gyroscope, is that the requirement for slip rings for the drive motor is eliminated. Moreover, this particular construction enables the weight of the gimbal-supported components to be a minimum. This, as noted above, serves to reduce rotor inertia and to improve the characteristics of the gyroscope.

The construction of the drive motor of the embodiment of the invention referred to in the preceding paragraphs is such that relative motion between the stator (which is mounted on the frame of the gyroscope) and the rotor (which is mounted on the gimbal of the gyroscope) will occur, as the gimbal rotates about the output axis. This, however, is advantageous as it results in damping and restraining effects. Both these effects are useful and desirable in the normal operation of the rate gyroscope.

In the embodiment of the invention to be described, however, the major portion of the damping and restraining effects in the rate gyroscope are provided by a torsion bar spring and by a magnetic damping mechanism. For operation in a wide temperature range, the material for the torsion bar spring is chosen to provide a relatively constant spring elasticity coefficient throughout the wide range. The magnetic damping mechanism to be described is also operable through a wide temperature range. The use of such a damping mechanism is made possible in the construction of the invention because of the small rotor sizes and weights that can be used, and because of the correspondingly small damping forces which are required, when the teachings of the invention are followed.

Magnetic damping mechanisms cannot conveniently be used in most present day rate gyroscopes due to the extremely large sizes of such mechanisms which would be required to handle the mass of the gimbal-supported components in such prior art assemblies. This is because of basic limitations or air gaps and flux densities; and because forces available increase approximately linearly with the size of the gyroscope, while the damping forces required increase exponentially with size. The embodiment of the invention to be described approaches the optimum size for efficient utilization of the magnetic damper.

Further features and advantages of the invention will become apparent from a consideration of the accompanying drawings and of the following specification.

In the drawings:

Figure 1 is a perspective view of one embodiment of the gyroscope of the invention, partly in section, and taken from one end of the gyroscope, this view revealing the rotor for the gyroscope and the drive motor with its stator mounted on the frame of the gyroscope, and this view also showing an induction type pickoff which is used in the illustrated embodiment of the invention and a drag-cup magnetic type damper which also is used;

Figure 2 is a perspective view of the gyroscope, partly in section, and taken from the other end of the gyroscope, this latter view revealing the induction-type pickoff in more detail, and also showing a torsion bar support for the gimbal of the gyroscope;

Figure 3 is a side sectional view of the gyroscope, taken substantially on the line 3—3 of Figure 1, this latter view showing in more detail the drag-cup magnetic damper assembly, the inductive-type pick-off assembly, and the manner in which the gimbal is mounted on the frame of the gyroscope; and Figure 4 is a side sectional view of the gyroscope, taken substantially on the line 4—4 of Figure 3, and this view showing the details of the rotor of the gyroscope and the manner in which it is rotatably mounted in the gimbal of the gyroscope.

With reference to the drawings, it will be observed that the illustrated gyroscope includes an outer housing 10 whose longitudinal axis lies along the output axis I—I of the gyroscope. The housing 10 is generally cylindrical in shape, and it includes an annular collar 12 which extends about its outer periphery and which serves to facilitate mounting the gyroscope.

The housing 10 includes a cover 14 which is threaded into one end of the housing in a manner such that the outer surface of the cover is flush with the end of the housing. A cylindrical shaped permanent-magnet member 16 is affixed to the inner surface of the cover, and this permanent magnet is supported by the cover in coaxial relationship with the I—I axis of the assembly.

Alnico V is suitable material for the permanent magnet 16, and the material is magnetized in a transverse direction with respect to the member 16. The choice of Alnico V is appropriate for high temperature operation of the gyroscope assembly. This is because the permeability of the material is relatively constant up to 750° F. The permanent magnet, therefore, will not introduce any major changes in the damping characteristics of the instrument as the ambient temperature rises to such a value.

A bearing 18 (Figure 3) is mounted in the permanent magnet 16 at the center of the permanent magnet and in coaxial relationship with the I—I axis of the assembly. A supporting spindle 20 for the gimbal of the gyroscope is rotatably supported in the bearing 18. The other end of the gimbal is supported by a torsion bar 22 in the illustrated embodiment. However, other supporting means, such as flexure pivots, may be used.

As more clearly shown in Figures 2 and 3, the left hand end of the torsion bar 22 in Figures 2 and 3 is attached to the gimbal, and that end of the torsion bar is rotatably mounted in a bearing 24. The bearing 24 and the right hand end of the torsion bar 22 are supported by a sleeve 26. The sleeve 26 is supported in the frame 30 of the assembly. A disc-shaped member 32 is threaded to the right hand end of the sleeve 26 and rigidly holds the sleeve in the frame.

The gimbal of the gyroscope is designated generally as 34, and the gimbal is pivotally supported in the frame 30 for limited angular movement about the I—I axis. The gimbal is so supported by the spindle 20 at one end and by the torsion bar 22 at the other. Angular movement of the gimbal about the I—I axis is restrained by the torsion bar and by a magnetic damper to be described and which includes the permanent magnet 16.

The torsion bar 22 may be composed of any suitable resilient material. A material such as "perma-nickel," for example, is advantageous because it produces a constant torque throughout a wide temperature range. This is because the modulus of elasticity of that material is relatively constant with temperature. Under some circumstances, it may be desirable to select a material for the torsion bar whose modulus of elasticity changes with temperature in order to compensate for changes in the characteristics of the assembly due to changing parameters of other components.

As shown in Figures 1, 3 and 4, the spindle 20 of the gimbal 34 is supported in an end member 40. This end member is attached to the gimbal by means of a pair of screws 42. A tubular shaped drag cup 44 is mounted on the end member 40, and the drag cup is positioned in nested concentric relationship with the permanent magnet 16 about the I—I axis. The drag cup is composed of an electrically conductive material such as copper.

Any movement of the gimbal 34 about the I—I axis causes the drag cup 44 to rotate in the magnetic field of the permanent magnet 16. Such rotation causes the field of the permanent magnet to produce eddy currents in the drag cup. These eddy currents, in turn, set up magnetic fields which react with the field of the permanent magnet to oppose such angular movement of the gimbal about the I—I axis. This results in a desired damping action on the gimbal.

As noted above, the gimbal 34 is supported on the frame 30 for limited angular movement about the axis I—I. This movement is restrained and damped by the torsion bar 22 and by the magnetic damper which includes the vane member 44 and the permanent magnet member 16. An inertial mass member 50 is supported in the gimbal 34 for rotation about an axis X—X which is disposed at right angles to the axis I—I (Figure 4). The inertial mass 50 is so supported by a pair of bearing assemblies 52 and 54. The bearing assemblies are mounted on opposite sides of the gimbal 34 as shown most clearly in Figure 4.

An annular member 56 of magnetic material is positioned on the periphery of the inertial mass member 50. The annular member 56 forms the rotor of a hysteresis drive motor, and the rotor is coupled mechanically to the inertial mass member 50. In accordance with one of the aspects of the present invention, the stator 58 of the hysteresis motor is mounted on the frame member 30 (see Figure 1). This is contrary to most prior art practices by which the stator is mounted on the gimbal. This, as noted above, reduces the inertia and mass of the gimbal assembly. In accordance with motor operating principles, the rotor 56 is disposed in magnetically coupled relationship with the stator 58, and the stator causes a torque to be exerted on the rotor upon the introduction of an electric current to the stator.

In a constructed embodiment of the invention, the rotor had a moment of inertia 2.16 grams.cm.$^2$, the rotor had an angular momentum of 5440 gram.cm.$^2$ per second; the rotor was driven at 24,000 r.p.m.; and the rate range of the instrument was 50° per second. As noted, the drive motor may be of the hysteresis type. The stator may be coated with a ceramic film to bond the stator laminations. This film may also provide the required stator slot insulation. The stator winding may be formed of anodized aluminum wire, for example, or of copper wire with a silicone coating. The stator winding may be encapsulated with a silicone type resin.

The stator laminations are preferably formed of a material exhibiting low change in permeability with temperature. Commercially pure iron is suitable for the purpose. The use of a hysteresis type motor is an advantage in that once it is up to synchronous speed, it can withstand changes in voltage and current without affecting its performance. However, other types of motors, such as squirrel cage induction motors, may also be used.

As noted above, the relatively low mass and inertia of the gimbal which is possible in the gyroscope of the present invention permits the use of magnetic damping. This, in turn, precludes the necessity of using fluids so that the gyroscope may be used in wide ranges of ambient temperature.

The gyroscope of the invention may use a multi-polar inductive transducer pick-off, for example. This pick-off includes a rotor 70 which is affixed to the gimbal 34, and it is disposed in coaxial relationship with the torsion bar 22 (and the I—I axis) and at the opposite end of the gimbal from the drag cup 44. As illustrated, the rotor may be of the laminated type. The pick-off also includes a stator 72 which also is laminated and which is affixed to the frame 30. The stator includes a winding 74. The stator winding may be excited with an alternating electric current of, for example, 12 volts. The pick-off develops a signal indicative of angular movements of the gimbal about the I—I axis.

A plurality of pins 76 are mounted at one end of the gyroscope, and these pins serve as electric terminals for the windings of the drive motor and pick-off. It will be noted that these windings are mounted on the frame of the gyroscope so that there is no need for slip-rings, or equivalent connectors in the assembly.

The invention provides, therefore, an improved gyroscope assembly in which the drive motor has its stator mounted on the frame of the instrument, rather than on the gimbal. This feature, as noted above, inter alia, reduces the mass and inertia of the gimbal for improved operating characteristics of the instrument.

The above construction also permits magnetic damping to be used so that the unit may be used in a wide temperature range, and the invention also provides an instrument in which an improved damper mechanism of the magnetic type is provided.

I claim:

1. A gyroscope assembly including: a frame member, a hollow gimbal member, means for mounting the gimbal member on the frame member for limited angular movement about a first axis, an inertial mass member mounted in the gimbal member for rotation about a second axis disposed at right angles to the first axis, an electrically energized drive motor for the inertial mass having a rotor positioned on the inertial mass and having a stator mounted on the frame member and passing through said gimbal member adjacent said rotor for driving said rotor for any angular position of said gimbal member in a range of angular positions, a cylindrical-shaped transversely magnetized permanent magnet member mounted on the frame member in coaxial relationship with the first axis, a resilient member mechanically coupling said gimbal member to said frame member for limiting the angular positions of said gimbal member to the range of angular positions, and a cylindrical-shaped electrically-conductive member mounted on the gimbal member in nested relationship with the permanent magnet member for damping angular movements of the gimbal member about said first axis.

2. A gyroscope assembly, including, a hollow cylindrical frame member having a longitudinal axis, an elongate hollow gimbal member enclosed by said frame member and aligned along said longitudinal axis and rotatable about said longitudinal axis, a rotor pivotally mounted in said gimbal member for rotation about an axis perpendicular to said longitudinal axis, a stator supported by said frame and passing through said gimbal member adjacent said rotor for driving said rotor for any angular position of said gimbal member in a range of angular positions, a resilient member mechanically coupling one end of said gimbal member to said frame member for limiting the angular positions of said gimbal member to the range of angular positions, a damping drag cup mounted on the other end of said gimbal member and enclosed by said frame member, and a permanent magnet mounted in said frame and nested in said cup for damping angular movements of said gimbal member about said longitudinal axis, said gimbal member including a pivot pin at said other end rotatably mounted on said permanent magnet.

3. A gyroscope assembly in accordance with claim 2 wherein said rotor includes an annular member made of hysteresis material to function together with said stator in said gimbal member and adjacent to said rotor as a hysteresis motor.

References Cited in the file of this patent

UNITED STATES PATENTS

| | | |
|---|---|---|
| 1,802,108 | Chessin | Apr. 21, 1931 |
| 2,384,838 | Kellogg | Sept. 18, 1945 |
| 2,416,300 | Godsey | Feb. 25, 1947 |
| 2,672,054 | Warren et al. | Mar. 16, 1954 |
| 2,805,578 | Wright | Sept. 10, 1957 |
| 2,839,932 | Hayner | June 24, 1958 |